United States Patent
Feldman

(10) Patent No.: US 10,502,364 B2
(45) Date of Patent: Dec. 10, 2019

(54) SHIELD HARNESS FOR MOUNTAIN A CAMERA

(71) Applicant: Force Protection Video Equipment Corp., Cary, NC (US)

(72) Inventor: Paul Feldman, Cary, NC (US)

(73) Assignee: Force Protection Video Equipment Corp., Cary, NC (US)

( * ) Notice: Subject to any disclaimer, the term of this patent is extended or adjusted under 35 U.S.C. 154(b) by 0 days.

(21) Appl. No.: 15/844,832

(22) Filed: Dec. 18, 2017

(65) Prior Publication Data
US 2018/0180219 A1 Jun. 28, 2018

Related U.S. Application Data

(60) Provisional application No. 62/438,824, filed on Dec. 23, 2016.

(51) Int. Cl.
| | |
|---|---|
| *F16M 13/04* | (2006.01) |
| *G03B 29/00* | (2006.01) |
| *F41H 5/08* | (2006.01) |
| *G03B 17/56* | (2006.01) |

(52) U.S. Cl.
CPC .............. *F16M 13/04* (2013.01); *F41H 5/08* (2013.01); *G03B 17/561* (2013.01); *G03B 29/00* (2013.01)

(58) Field of Classification Search
CPC ........ F16M 13/04; F41H 5/08; G03B 17/561; G03B 29/00; A45F 5/00; B60P 7/0823; B60R 2011/0063; B60R 2011/0077; A63B 2209/10

USPC ................ 248/682, 690, 205.2, 309.1, 316.8
See application file for complete search history.

(56) References Cited

U.S. PATENT DOCUMENTS

| | | | | | |
|---|---|---|---|---|---|
| 2,304,367 | A | * | 12/1942 | Meyer ........................ | F21L 4/00 |
| | | | | | 222/175 |
| 3,668,802 | A | * | 6/1972 | Benward ................ | A01K 97/06 |
| | | | | | 43/57.1 |
| 4,479,596 | A | * | 10/1984 | Swanson ................ | A45C 11/00 |
| | | | | | 224/236 |
| 4,948,022 | A | * | 8/1990 | VanDyke ................ | B60R 7/088 |
| | | | | | 224/483 |
| 5,121,865 | A | * | 6/1992 | Howard .................... | A45F 5/00 |
| | | | | | 224/240 |
| 5,887,776 | A | * | 3/1999 | Munoz ..................... | A45F 5/00 |
| | | | | | 224/269 |
| 6,695,187 | B1 | * | 2/2004 | Dunkle ..................... | A45F 3/04 |
| | | | | | 224/601 |
| 8,073,131 | B2 | * | 12/2011 | Bodkin et al. ......... | A45C 3/001 |
| | | | | | 379/406.1 |
| 8,479,960 | B2 | * | 7/2013 | Lopez-Apodaca ........................ | |
| | | | | | B60R 11/0241 |
| | | | | | 224/312 |

(Continued)

*Primary Examiner* — Anita M King
(74) *Attorney, Agent, or Firm* — Forrest Firm, P.C.

(57) ABSTRACT

A harness for mounting a camera to a shield is provided. The harness includes two vertical brackets, a horizontal bracket and an adhesive. The two vertical brackets each define a proximal end facing the shield and define a bottom end opposite a top end. The horizontal bracket is positioned between the bottom ends and the shield for supporting the camera. The adhesive is applied to at least a portion of each of the proximal ends for securing the harness to the shield. At least one strap may be provided for further securing the camera within the vertical brackets of the harness.

7 Claims, 4 Drawing Sheets

(56) References Cited

U.S. PATENT DOCUMENTS

| | | | | |
|---|---|---|---|---|
| 8,646,736 B2 * | 2/2014 | Berry | ............... | F45F 5/021 |
| | | | | 248/121 |
| 8,979,060 B1 * | 3/2015 | Olsson et al. | ....... | F16M 11/041 |
| | | | | 248/634 |
| 2005/0167458 A1 * | 8/2005 | Weiss | ............ | A45F 5/00 |
| | | | | 224/250 |
| 2017/0284433 A1 * | 10/2017 | Thomas | ............ | F16C 11/06 |

* cited by examiner

SHIELD HARNESS FOR MOUNTAIN A CAMERA

CROSS-REFERENCE TO RELATED APPLICATIONS

This applications is a utility application which claims the benefit of U.S. Provisional Patent Application No. 62/438,824 filed Dec. 23, 2016, the content of which is incorporated by reference in its entirety.

TECHNICAL FIELD

The present technology relates generally to a harness for mounting an electronic device. Particular embodiments are directed to a harness for mounting a camera to a shield.

BACKGROUND

Public disturbances are occurring with greater frequency, which has resulted in the deployment of greater numbers of police forces armed with riot gear. Further, due to the increased interaction between police forces and the public, many have called for such interactions to be monitored more closely. By equipping police forces and other security personnel with body cameras, interactions can be reviewed to ensure accountability of all parties involved, and to help separate truth from fiction.

Although personal body cameras have been equipped to the bodies, uniforms or headgear of police officers and military and security personnel, little attention has been given to mounting cameras (and other electronic devices) to SWAT and riot officers who carry shields for protection and crowd management. Shields equipped with front-facing cameras would permit chaotic events and interactions to be recorded for later analyzation. Further, a harness or apparatus that could be retrofitted to already-existing shields would provide much benefit to security forces and personnel.

SUMMARY OF THE INVENTION

This summary is provided to introduce in a simplified form concepts that are further described in the following detailed descriptions. This summary is not intended to identify key features or essential features of the claimed subject matter, nor is it to be construed as limiting the scope of the claimed subject matter.

According to at least one embodiment, a harness for mounting a camera to a shield is provided. The apparatus may include two vertical brackets each defining a proximal end facing the shield and defining a bottom end opposite a top end; a horizontal bracket positioned between the bottom ends and the shield for supporting the camera; and an adhesive applied to at least a portion of each of the proximal ends for securing the harness to the shield.

According to some embodiments, the adhesive includes hooks for securing the harness to a loop layer, wherein the loop layer includes a second adhesive for securing the loop layer to the shield.

According to some embodiments, the harness further includes a backing extending between distal ends of each of the vertical brackets.

According to some embodiments, the backing defines a cutout for accessing and/or viewing a portion of the camera when the camera is mounted to the shield.

According to some embodiments, the harness further includes at least one strap having a secured end secured to one vertical bracket and an unsecured end.

According to some embodiments, the unsecured end is configured for selective securement with a receptor secured to the other vertical bracket and/or the at least one strap.

According to some embodiments, the selective securement of the at least one strap permits variances in the tension of securement.

According to some embodiments, the harness further comprises inserts shaped for inserting between the vertical brackets for stabilizing the camera when mounted.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
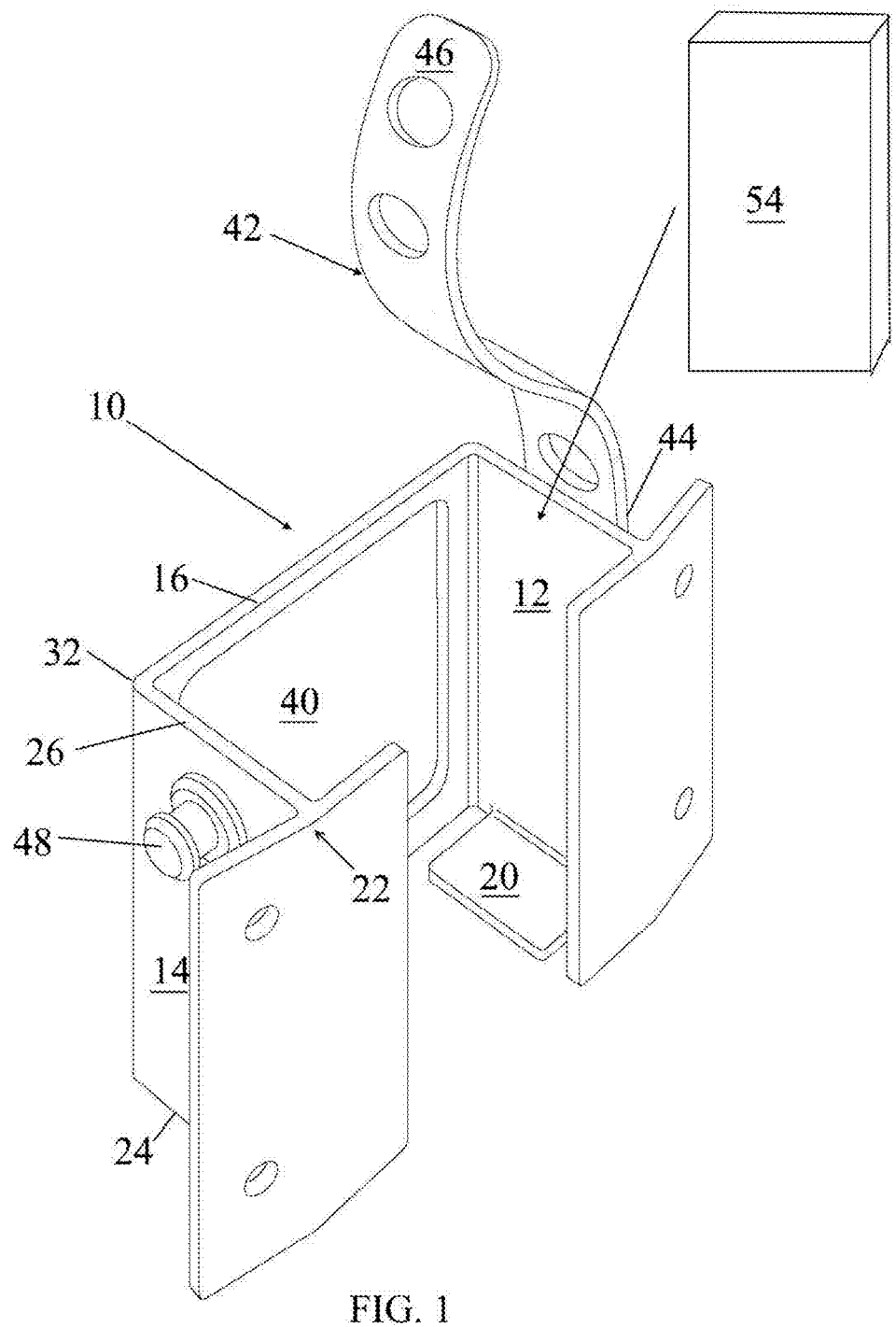
FIG. 1 is an illustration of a harness including a top strap for mounting a camera to a shield according to at least one embodiment of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

Referring to FIGS. 1-4, a harness 10 for mounting a camera to a shield is provided. The harness 10 may include two vertical brackets 12, 14 and may also include a horizontal bracket 20 for securing the camera within the harness 10. The two vertical brackets 12, 14 may each define a proximal end 22 facing the shield and may each define a distal end 32. Further, the two vertical brackets 12, 14 may each define a top end 26 and a bottom end 24. The vertical brackets 12, 14 may be configured in any number of shapes or sizes for securing a variety of cameras within the harness 10.

Notably, while the description herein is directed towards a camera and a shield, any electronic device may be used similarly to the camera and any portable accessory or surface may be used in place of the shield. For example, a smartphone may be mounted to a sign carried during a protest. Alternatively, a GPS unit may be mounted to a longboard while in use.

The proximal end 22 of the vertical brackets 12, 14 may face the shield and may be secured thereto when the harness 10 is secured to the shield. The proximal ends 22 may be substantially flat or curved. In some embodiments, the proximal ends 22 may be curved to conform or nestably secure to the shield. For example, some shields may define a concave or convex surface and the proximal ends 22 may each be concave or convex, respectively, for a nesting engagement with the surface of the shield. The curve of the proximal ends 22 may be shaped to ensure that the vertical brackets 12, 14 are secured to the shield at a certain angle. For example, the certain angle may be ninety degrees, forty-five degrees or any other angle desired (e.g., see FIG. 2).

In some embodiments, the harness 10 includes an adhesive 30 applied to at least a portion of each of the proximal ends 22 for securing the harness 10 to the shield. The adhesive 30 may be any substance or structure used for securing objects or materials together, such as, but not limited to, glues, epoxies, cements, hook and/or loop fasteners and tapes. In one embodiment, the adhesive 30 may include hooks for securing the harness to loops of a loop layer 34, wherein the loop layer includes a second adhesive 36 for securing the loop layer 34 to the shield. In some embodiments, the adhesive 34 30 is a layer of substance or structure which can be removed and/or replaced as desired, permitting the adherence of the proximal ends 22 to be repaired and/or enhanced as desired. Notably, because the harness 10 of the present invention may be secured to the shield using an adhesive 30, the integrity of the shield remains fully intact. Conversely, if fasteners were used to secure the harness 10 to the shield, such as screws, bolts or buttons, the integrity of the shield may be jeopardized, leading to breakage of the shield and/or injury to security personnel. Additionally, using an adhesive 30 permits easy retrofitting of shields currently in use or already purchased, in comparison to using fasteners, which may require shield modification.

The vertical brackets 12, 14 may extend from the proximal ends 22, along the top end 26 and the bottom end 24, to a distal end 32. The top end 26 and the bottom end 24 may be opposite each other. The top ends 26 and/or the bottom ends 24 may be substantially straight or may be curved. The vertical brackets 12, 14 may have a substantially uniform thickness or the thickness may vary for providing flexibility and/or enhanced support. The vertical brackets 12, 14 may be porous or may be substantially impermeable. For example, the vertical brackets 12, 14 may be comprised of netting or may include multiple vertical brackets 12, 14.

The vertical brackets 12, 14 may extend from the shield and about a camera secured within the harness 10 such that the distal ends 32 are substantially facing each other. The distal ends 32 may be configured to be positioned a certain distance from each other, thereby providing a cutout or access space 40 between the vertical brackets 12, 14 for accessing and/or viewing a portion of the camera when secured within the harness 10. In other embodiments, the harness 10 may include a backing 16 extending between the distal ends 32 of each of the vertical brackets 12, 14. The backing 16 may define a cutout or access space 40 for accessing and/or viewing a portion of the camera when the camera is secured within the harness 10. The cutout 40 may be substantially rectangular shaped and may be positioned near the top ends 26 or the bottom ends 24 or be substantially centered therebetween.

The harness 10 may further include a horizontal bracket 20 positioned between the bottom ends 24 and the shield for supporting the camera within the vertical brackets 12, 14 of the harness 10. The horizontal bracket 20 may have a substantially uniform thickness or the thickness may vary for providing flexibility and/or enhanced support. The horizontal bracket 20 may be porous or may be substantially impermeable. For example, the horizontal bracket 20 may be comprised of netting or may include multiple horizontal brackets 20. In some embodiments, the horizontal bracket 20 may extend between an entire area defined by space between the vertical brackets 12, 14 and the shield. Alternatively, the area may be further defined by a backing 16 included in the harness 10. In one embodiment, the horizontal bracket 20 may only extend between the backing 16 and the shield, and not extend out to the bottom ends 24 of the vertical brackets 12, 14. In other embodiments, the horizontal bracket 20 only extend across a portion of the space between the vertical brackets 12, 14, shield, and/or backing 16, thereby allowing the harness 10 be tightened and flexed. In one embodiment, the horizontal bracket 20 may be one or more bars extending between the vertical brackets 12, 14. Some or all of the one or more bars may be connected with a flat surface for supporting the camera.

Referring again to FIG. 2, the harness 10 may include at least one strap 42 for securing the camera within the harness 10. The at least one strap 42 may extend between the two vertical brackets 12, 14, between a vertical bracket 12, 14 and the backing 16, or between two positions on the backing 16. The at least one strap 42 may extend over the cutout or access area 40 or the at least one strap 42 may extend over the open area opposite the horizontal bracket 20, as in FIG. 1. Each of the at least one straps 42 may define a secured end 44 extending from, and secured to, a vertical bracket 12, 14 or backing 16. In one embodiment, the secured end 44 may extend from the intersection of a vertical bracket 12, 14 and the backing 16. Further, each of the at least one strap 42 may define an unsecured end 46 configured for selective securement with a receptor 48. The receptor 48 may be secured to a vertical bracket 12, 14, a backing 16 or both at the intersection of the vertical bracket 12, 14 and backing 16.

The at least one strap 42 may include loops for selectively securement with hooks of the receptor 48. Alternatively, the at least one strap 42 may include both loops and hooks for selective securement about a receptor defining an aperture therethrough the at least one strap 42 may extend through and about the aperture for selectively securing to itself as well. The at least one strap 42 may employ alternative fasteners for selectively securing the strap 42 and the receptor 48. The selective securement of the at least one strap 42 to the receptor 48 and/or itself may permit tension variances in the securement for accommodating differing-sized cameras and uses.

Figure 2:
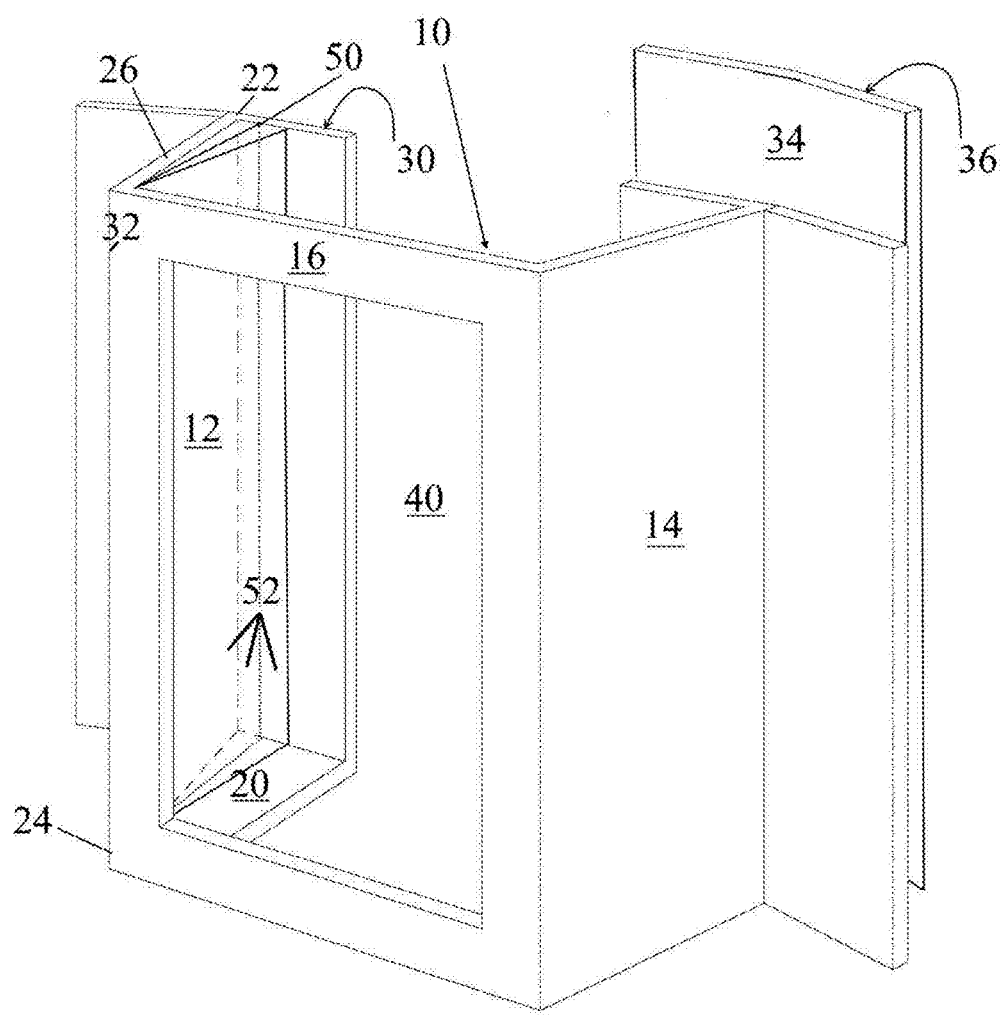
FIG. 2 is an illustration of a harness for mounting a camera to a shield according to at least one embodiment of the present invention.
Figure 3:
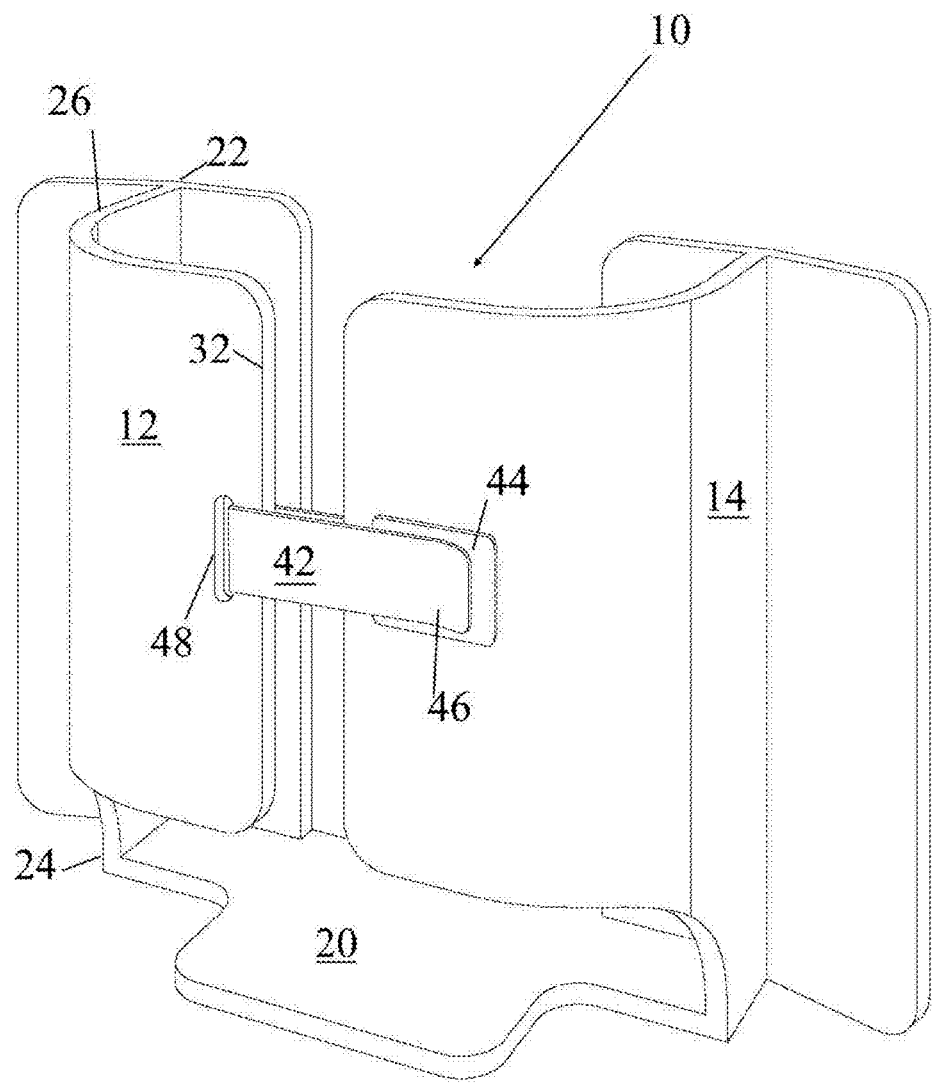
FIG. 3 is an illustration of a harness including a front strap for mounting a camera to a shield according to at least one embodiment of the present invention.

Various portions of the harness 10 may be covered by foam, liner, plastic, rubber or other deformable and/or protective material 50 (e.g., see FIG. 2). In one embodiment, interior portions of the vertical brackets 12, 14, backing 16, horizontal bracket 20 and/or shield may include a layer of deformable and/or protective material 50. The material 50 may further serve to stabilize the camera when secured in the harness 10 and reduce vibration and unwanted movements. The material may be provided separately in layers 52 for customized layering of the shield and/or harness 10. Various material layers 52, comprised of various materials 50 may be provided. Further, materials may be specifically shaped as inserts 54 for being placed within the harness 10 to fill any voids and enhance securement of the camera within the harness (e.g., see FIG. 1). The inserts 54 may help to reduce vibrations and undesired movements.

Figure 4:
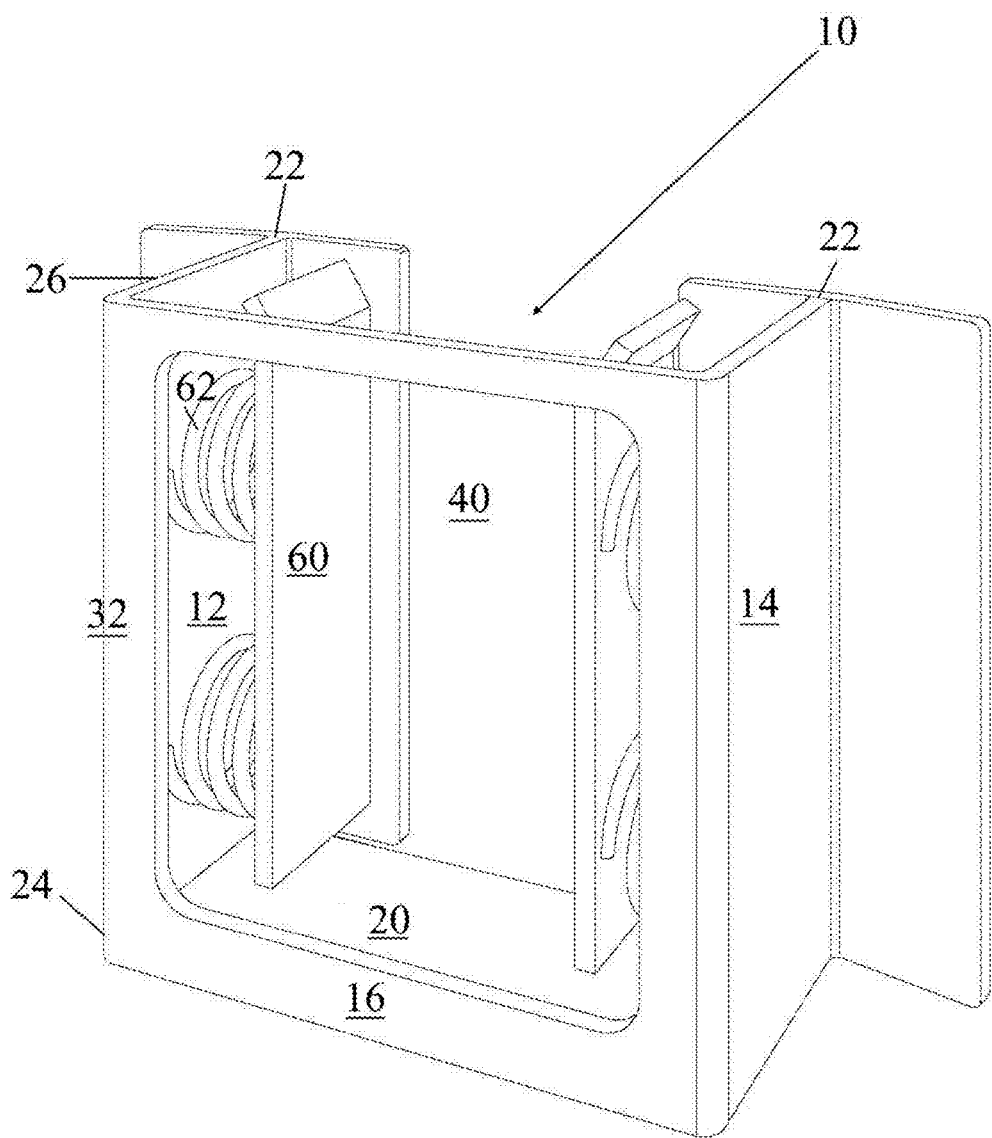
FIG. 4 is an illustration of a harness including spring securements for mounting a camera to a shield according to at least one embodiment of the present invention

Turning to FIG. 4, some embodiments of the invention may include springs 60 and spring securements 62 for securing the camera or other device within the harness 10. The springs 60 may extend between each of the vertical brackets 12, 14 and the spring securements. One, two or more springs may engage each vertical bracket 12, 14. The spring securements 62 may be flat or may be shaped to conform the camera or other device. For example, the upper portion of the spring securements 62 may be angled for easier placement of the device therebetween. In some embodiments, a single spring securement 62 may be included. In other embodiments, two or more securements 62 may be included.

Many changes and modification could be made to the invention without departing from the spirit thereof. The scope of these changes will become apparent from the appended claims.

The invention claimed is:

1. A harness for mounting a camera to a shield comprising:
    two vertical brackets each defining a proximal end facing the shield and defining a bottom end opposite a top end, wherein the proximal ends are curved for nestably securing to the shield;
    a horizontal bracket positioned between the bottom ends and the shield for supporting the camera;
    an adhesive applied to at least a portion of each of the proximal ends for securing the harness to the shield; and
    at least one strap having a secured end secured to one of the vertical brackets and an unsecured end.

2. The harness of claim 1, wherein the adhesive includes hooks for securing the harness to a loop layer, wherein the loop layer includes a second adhesive for securing the loop layer to the shield.

3. The harness of claim 1, further including a backing extending between distal ends of each of the vertical brackets.

4. The harness of claim 3, wherein the backing defines a cutout for accessing and/or viewing a portion of the camera when the camera is mounted to the shield.

5. The harness of claim 1, wherein the unsecured end is configured for selective securement with a receptor secured to another of the vertical brackets and/or the at least one strap.

6. The harness of claim 5, wherein the selective securement of the at least one strap permits variances in the tension of securement.

7. The harness of claim 1, further comprising inserts shaped for inserting between the vertical brackets for stabilizing the camera when mounted.

* * * * *